United States Patent
Thunstrom et al.

(10) Patent No.: US 9,371,617 B2
(45) Date of Patent: Jun. 21, 2016

(54) SYNTHETIC FIELD GROOMING PROCESSES AND CONDITIONING GROOMING APPARATUS

(71) Applicant: Kromer Co. LLC, Plymouth, MN (US)

(72) Inventors: Troy D. Thunstrom, Bloomington, MN (US); Nathan G. Bergquist, Mound, MN (US); Alan L. Hentges, Savage, MN (US); Brian C. Bergquist, Mound, MN (US); Ronald C. Ponath, Plymouth, MN (US); Ingo V. Werner, Belle Plaine, MN (US)

(73) Assignee: Kromer Co. LLC, Plymouth, MN (US)

( * ) Notice: Subject to any disclaimer, the term of this patent is extended or adjusted under 35 U.S.C. 154(b) by 96 days.

(21) Appl. No.: 14/051,072

(22) Filed: Oct. 10, 2013

(65) Prior Publication Data

US 2014/0096984 A1    Apr. 10, 2014

Related U.S. Application Data

(60) Provisional application No. 61/711,928, filed on Oct. 10, 2012.

(51) Int. Cl.
*E01C 23/06* (2006.01)
*A01B 45/00* (2006.01)
*E01C 23/082* (2006.01)

(52) U.S. Cl.
CPC ............... *E01C 23/06* (2013.01); *A01B 45/00* (2013.01); *E01C 23/082* (2013.01)

(58) Field of Classification Search
CPC ....... E01C 23/06; E01C 23/08; E01C 23/082; A01B 45/00; A47L 11/32; A47L 11/34; A47L 11/4036; A47L 11/408; E01H 1/00; E01H 1/02; E01H 1/101; E01H 1/105; E01H 1/14
USPC ........................................... 15/340.4
See application file for complete search history.

(56) References Cited

U.S. PATENT DOCUMENTS

| | | | | |
|---|---|---|---|---|
| 3,685,468 A | * | 8/1972 | Paige et al. ..................... 111/11 |
| 4,255,827 A | * | 3/1981 | Palazzo .......................... 15/160 |
| 4,836,295 A | * | 6/1989 | Estes ............................. 172/146 |
| 4,989,676 A | * | 2/1991 | Rogers .......................... 172/438 |

(Continued)

*Primary Examiner* — Robert Pezzuto
*Assistant Examiner* — Jessica H Lutz
(74) *Attorney, Agent, or Firm* — John D. Veldhuis-Kroeze; Westman, Champlin & Koehler, P.A.

(57) ABSTRACT

Disclosed is a synthetic athletic field grooming apparatus configured to be pulled by a vehicle to maintain the synthetic athletic field. The apparatus comprises a frame having a coupling mechanism for mounting the apparatus to the vehicle. At least one broom channel is coupled to the frame rearward of the coupling mechanism, and forward and aft rows of brushes are attached to the broom channel. The aft row of brushes is spaced apart from and rearward of the forward row of brushes to allow infill of the synthetic athletic field to flick upward from the forward row while containing the infill for re-agitation from the aft row. The coupling mechanism and the frame allow an attached vehicle to control a downward pressure forcing the rows of brushes into contact with the synthetic athletic field with a desired force. Also disclosed is a method of grooming a synthetic athletic field.

12 Claims, 11 Drawing Sheets

(56) References Cited

U.S. PATENT DOCUMENTS

| | | | | |
|---|---|---|---|---|
| 5,833,013 | A * | 11/1998 | Davis | 172/612 |
| 5,983,559 | A * | 11/1999 | Manabe | A01B 45/00 111/127 |
| 6,076,221 | A * | 6/2000 | Bradshaw | A46B 7/04 15/160 |
| 7,065,947 | B1 * | 6/2006 | Street et al. | 56/371 |
| 8,893,344 | B2 * | 11/2014 | Boucherie | A46B 3/06 15/159.1 |
| 2005/0044656 | A1 * | 3/2005 | Prevost | 15/345 |
| 2005/0194156 | A1 * | 9/2005 | Job | 172/21 |
| 2007/0174980 | A1 * | 8/2007 | Prevost | 15/50.1 |
| 2012/0096661 | A1 * | 4/2012 | Pizano et al. | 15/160 |

* cited by examiner

SYNTHETIC FIELD GROOMING PROCESSES AND CONDITIONING GROOMING APPARATUS

CROSS-REFERENCE TO RELATED APPLICATION

The present application is based on and claims the benefit of U.S. provisional patent application Ser. No. 61/711,928, filed Oct. 10, 2012, the content of which is hereby incorporated by reference in its entirety.

FIELD

The present invention relates to athletic field maintenance equipment, and more particularly to maintenance equipment used to maintain synthetic athletic fields, and methods of rejuvenating and maintaining synthetic turf fibers and associated infill material.

BACKGROUND

Synthetic turf fiber athletic fields have specific characteristics, which make them difficult to maintain. Maintenance requirements are constantly being defined. Often times, with heavy use by sports teams, marching bands, and others, fibers of synthetic athletic fields quickly become permanently worn with the infill material, typically rubber pellets or similar material, being compacted, clumped and encrusted with atmospheric dust and dirt. In addition to forming ruts, deteriorating performance and otherwise degrading the quality and safety of synthetic turf athletic fields, heavy use also quickly diminishes the aesthetic look of the fields. Often times capping occurs on synthetic turf athletic fields. Capping is a term frequently used to refer to the situation where the infill of a synthetic turf field becomes compacted and then dirt/dust glues it together and creates a hard pan of infill. This further damages grass fibers, because when grass fibers protrude out of the hard pan of encrusted infill, and are stepped on by athletes' shoes or cleats, the fibers are sharply bent over and are creased, or sometimes even severed, by this action. This may help to define why our process is so important and critical/different from other techniques. With many synthetic athletic fields being used in televised events, it is typically desirable to maintain both the quality and look of the field. Both of these goals have been difficult to achieve in the art.

SUMMARY

In an exemplary embodiment, disclosed is a synthetic athletic field grooming apparatus configured to be pulled by a vehicle across a synthetic athletic field for use in maintaining the synthetic athletic field. The synthetic athletic field grooming apparatus comprises a frame having a coupling mechanism at a front of the grooming apparatus for mounting the grooming apparatus to the vehicle. The apparatus also comprises at least one broom channel coupled to the frame rearward of the coupling mechanism and extending longitudinally from a first side of the at least one broom channel to a second side of the at least one broom channel. A forward row of brushes is attached to the at least one broom channel and extends longitudinally from the first side of the at least one broom channel to the second side of the at least one broom channel. An aft row of brushes is attached to the at least one broom channel such that the aft row of brushes is spaced apart from and rearward of the forward row of brushes relative to the coupling mechanism to allow infill of the synthetic athletic field to flick upward from the forward row of brushes while containing the infill for re-agitation from the aft row of brushes when the grooming apparatus is being pulled across a synthetic athletic field. The aft row of brushes extends longitudinally from the first side of the at least one broom channel to the second side of the at least one broom channel. In exemplary embodiments, the coupling mechanism and the frame are configured such that when attached to a vehicle and being pulled across the synthetic athletic field, the vehicle can control a downward pressure forcing the forward and aft rows of brushes into contact with the synthetic athletic field with a desired force.

In some exemplary embodiments, at least one of the forward and aft rows of brushes includes a pattern of alternating bristle height sections. The pattern of alternating bristle height sections comprises alternating short bristle sections and long bristle sections oriented diagonally to prevent infill material buildup in front of the brushes.

In some exemplary embodiments, the synthetic athletic field grooming apparatus also comprises a drag mat mounted behind the forward and aft rows of brushes and configured to level infill material.

In some exemplary embodiments, the synthetic athletic field grooming apparatus further comprises a tine support plate assembly coupled to the frame forward of the at least one broom channel and the forward and aft rows of brushes. The tine support plate assembly can include a plurality of tines with adjustable heights, angles and pressures configured to loosen and pull up compacted infill in the synthetic athletic field when the grooming apparatus is pulled by a vehicle across the synthetic athletic field. In some exemplary embodiments, the plurality of tines are configured to retract if the synthetic athletic field grooming apparatus is moved in a reverse direction such that damage to the synthetic athletic field is prevented.

In some exemplary synthetic athletic field grooming apparatus embodiments, the apparatus further comprises at least one magnet mounted between the plurality of tines and the forward row of brushes to collect metallic or magnetic debris flicked upward by the plurality of tines. In exemplary embodiments, the at least one magnet is mounted at a height such that it cannot contact the synthetic athletic field as the grooming apparatus is pulled by the vehicle across the synthetic athletic field.

In some exemplary embodiments, the synthetic athletic field grooming apparatus further comprises a deflector positioned forward and above the at least one magnet to guide the metallic or magnetic debris into the at least one magnet.

In some embodiments, the synthetic athletic field grooming apparatus is a finishing groomer and further comprises at least one spray boom coupled to the frame rearward of the aft row of brushes, and at least one spray nozzle mounted on the at least one spray boom and configured to spray an anti-static solution on the synthetic athletic field to prevent the infill material from sticking to blades of the synthetic athletic field.

In some exemplary embodiments, the at least one spray nozzle comprises at least one forward spray nozzle and at least one aft spray nozzle positioned rearward of the at least one forward spray nozzle. In these embodiments, the at least one forward spray nozzle is positioned closer to the aft row of brushes than is the at least one aft spray nozzle such that the at least one forward spray nozzle and the at least one aft spray nozzle spray the synthetic athletic field with blades of the synthetic athletic field being at different angles relative to vertical. In some exemplary embodiments, the at least one forward spray nozzle and the at least one aft spray nozzle are spaced along a width of the apparatus and are adjustable to allow adjustment of distances between spray nozzles to provide an adjustable spray pattern.

In accordance with some embodiments, a method of grooming a synthetic athletic field is provided. The method includes a step of using a vehicle to pull a conditioning groomer implement across the synthetic athletic field, in a back and forth pattern between the first and second spaced sides of the synthetic athletic field at an angle within a first range of angles, relative to a direction perpendicular to the first and second spaced sides, to de-compact and redistribute infill from the synthetic athletic field. The method also includes the step of using the vehicle to pull a finishing groomer implement across the synthetic athletic field to reinsert the infill within straightened blades of the synthetic athletic field.

DETAILED DESCRIPTION OF ILLUSTRATIVE EMBODIMENTS

Figure 1:
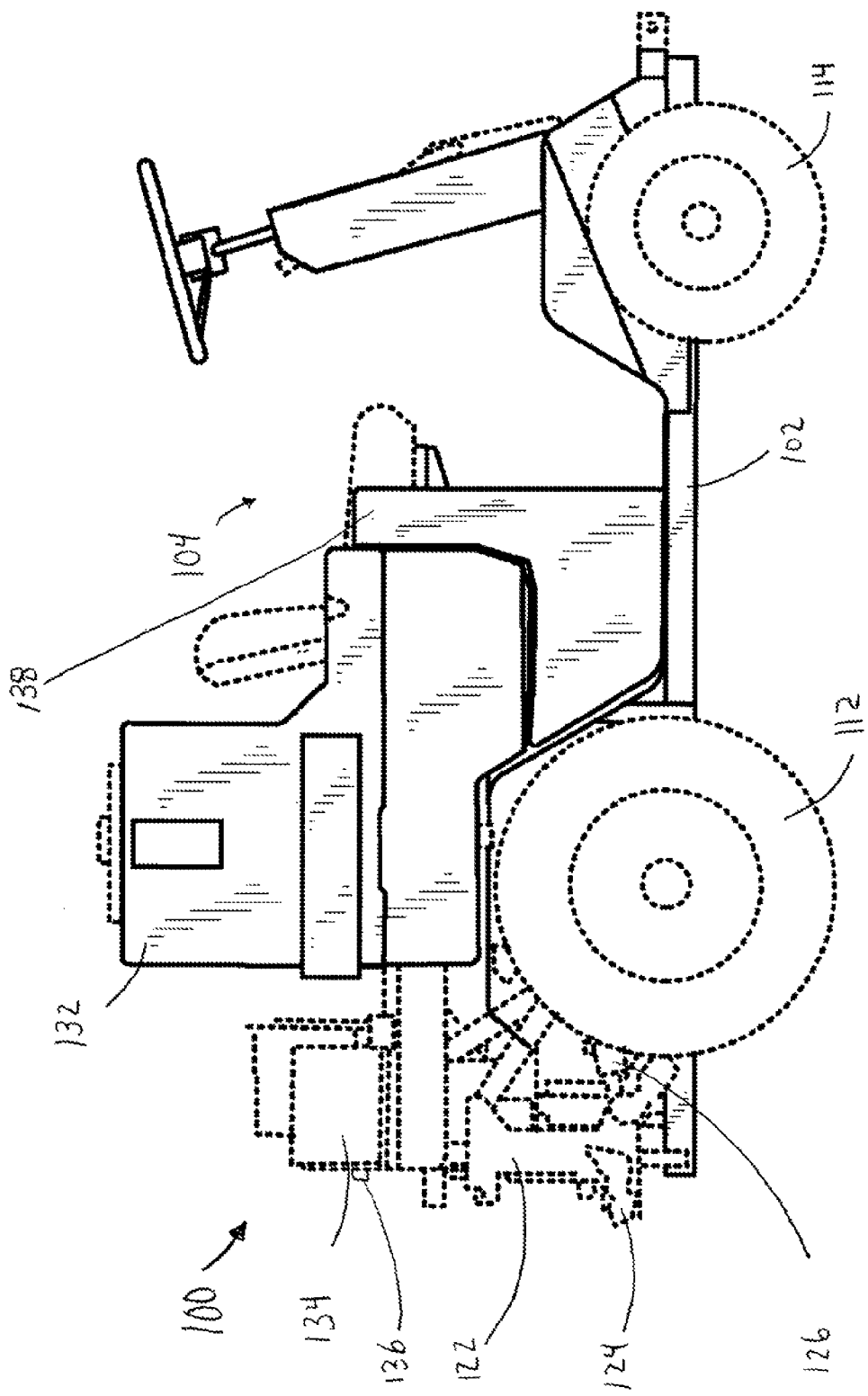
FIG. 1 illustrates a powered drive unit (tractor) with fluid componentry and lift mechanism.
Figure 2:
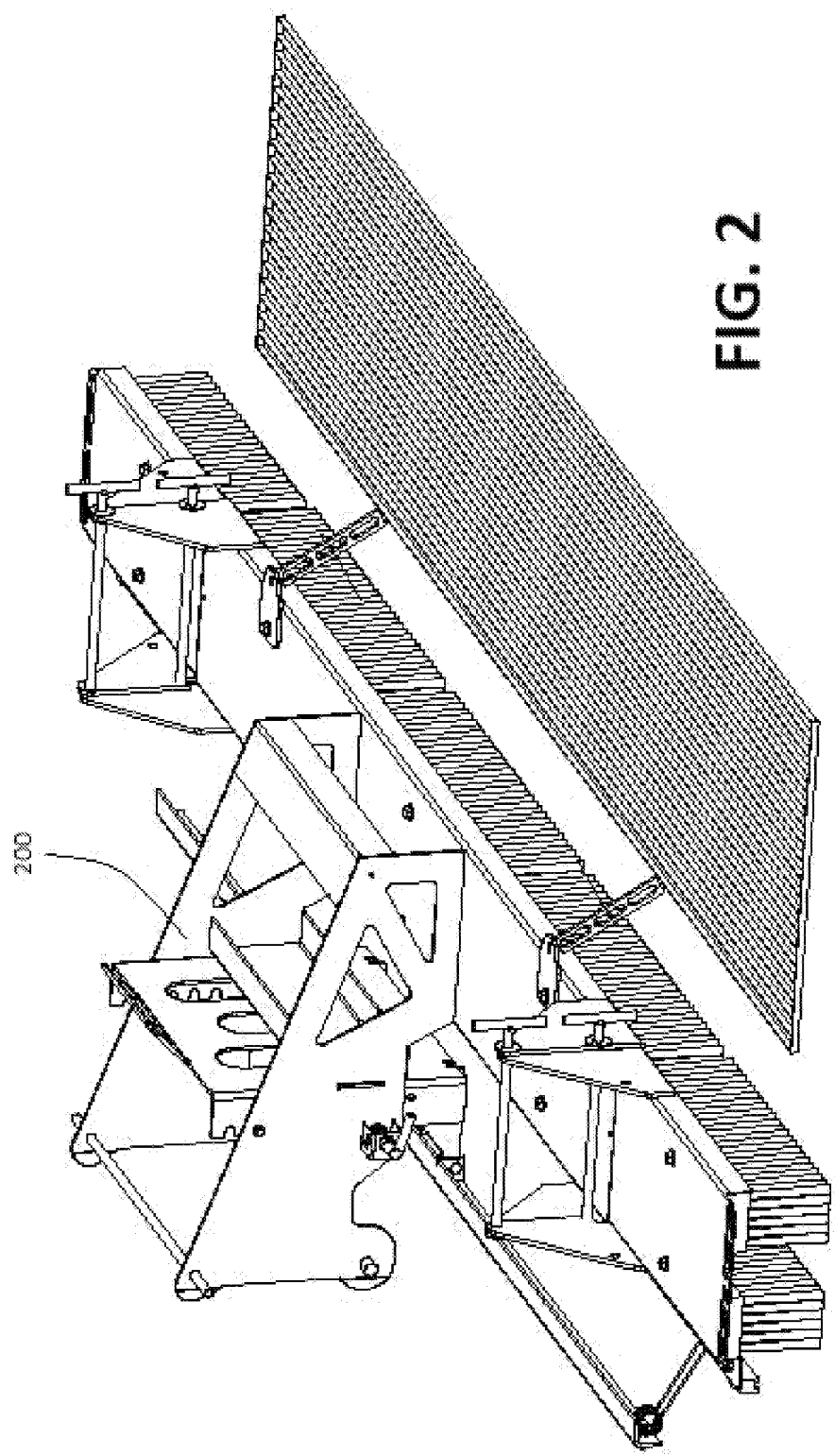
FIG. 2 shows a perspective view of conditioning groomer assembly.
Figure 3:
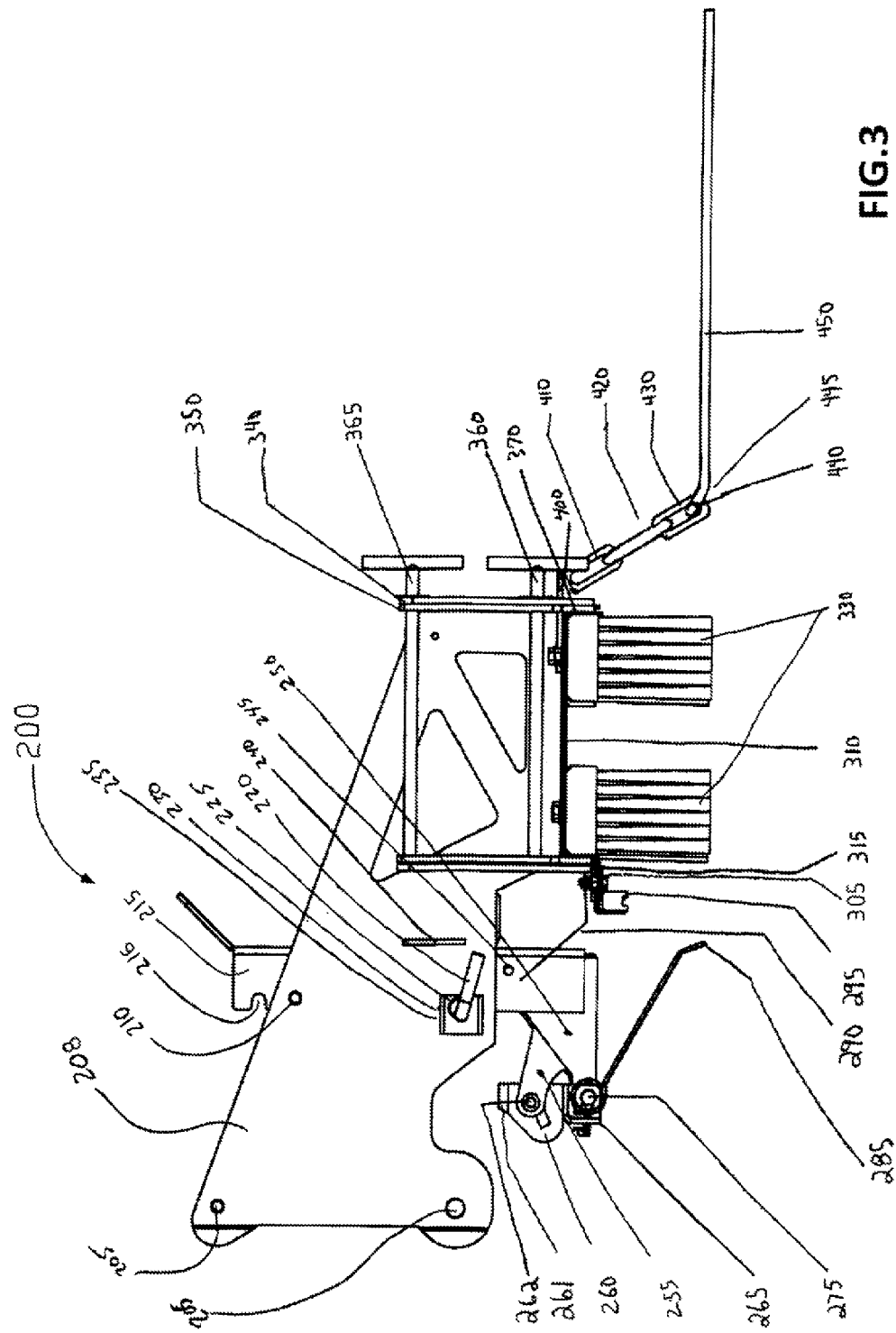
FIG. 3 is a side view of conditioning groomer assembly.

Referring first to FIG. 1, shown a self-propelled athletic field maintenance tractor 100 which can be used with disclosed grooming implement apparatus and methods in exemplary embodiments. However, the concepts discussed herein are to be construed as applying equally well to a unit which is not self-propelled, and configured as an implement to be connected to, pulled by, guided (i.e., steered), and/or powered by a vehicle such as a tractor or utility vehicle. Tractor 100 is depicted as a mobile vehicle, including a frame 102, on which is installed an operator station 104, an engine (not shown), ground support devices including variable speed drive wheels 112 and steerable wheels 114.

Attached to the rear of tractor is a quick attachment device, which includes hitch plate 122, a tool free quick attach latch mechanism 124, a hydraulic lift mechanism and cylinder 126, which provides modes of operation to provide pressure up and down, a free-floating mode, and a mode that locks the position at selected height.

Atop the frame and aft of the operator station is a fluid containment tank(s) 132, fluid pump 134, and fluid delivery hoses and fittings (not shown), and fitting attachment point 136 for fluid usage devices. Affixed to the tractor is an adjustable pressure regulating device 138 for adjusting pressure of pressurized fluid.

Disclosed in FIGS. 2-10 are system components and techniques for maintaining synthetic athletic fields. As mentioned above, a disclosed apparatus includes a wheeled tractor with a propel drive mechanism, a quick attach mount for attachments, a hydraulic lift/lower mechanism, a reservoir for fluid, a pump and associated pressure and flow controls for fluid. Implements for the tractor include a conditioning groomer implement for purpose of rejuvenating synthetic athletic field turf installation, and a finish groomer implement to prepare a field for usage after the conditioning groomer process has been completed.

Sports turf managers have enough to worry about. Field condition and its appearance need not be one of their worries. Hydraulically actuated synthetic field grooming implements or attachments, in combination with a corresponding tractor providing hydraulic or other activation of the attachment, makes creating a safe, playable and aesthetically pleasing field a manageable task. Knowing what to do—and when, has been difficult for field maintenance staff to decipher. Exemplary embodiments provide a method which incorporates all grooming functions into a complete and thorough 2-step grooming process. The system addresses problems associated with infill compaction, fiber entanglement and capping, poor water infiltration, dust and dirt contamination and uneven infill distribution. The first step utilizes a disclosed conditioning groomer, available from the Kromer Co. under the product name Synthetic Field Conditioning Groomer™, which is able to decompact, break up and clean clumped infill, remove magnetic debris, then redistribute and level the infill. The conditioning groomer provides indication and visual feedback to the operator, letting him or her know when the field is properly prepared and ready for the second step.

After completion of the first step grooming, loosened and redistributed infill largely lay atop the surface of the grass blade fibers and leaves the field with a dark or black appearance. The second step utilizes the disclosed finish groomer, available from the Kromer Co. under the product name Synthetic Field Finish Groomer™, in conjunction with a fluid pressurization system on the tractor, such as the Field Commander® tractor available from the Kromer Co., to properly reinsert the infill within the straightened grass blade fibers and functions to stand the grass blades back upright. Infill reinsertion is essential for proper support of the grass blades, helping prevent pile lean and flattening, and delivering a long life for expensive synthetic turf installation. The high-pressure anti-static solution with dual row solution jets quickly and effectively assists this process. In addition to the playability, durability and safety traits, the field is then left in an aesthetically prime, game-ready condition.

Figure 5:
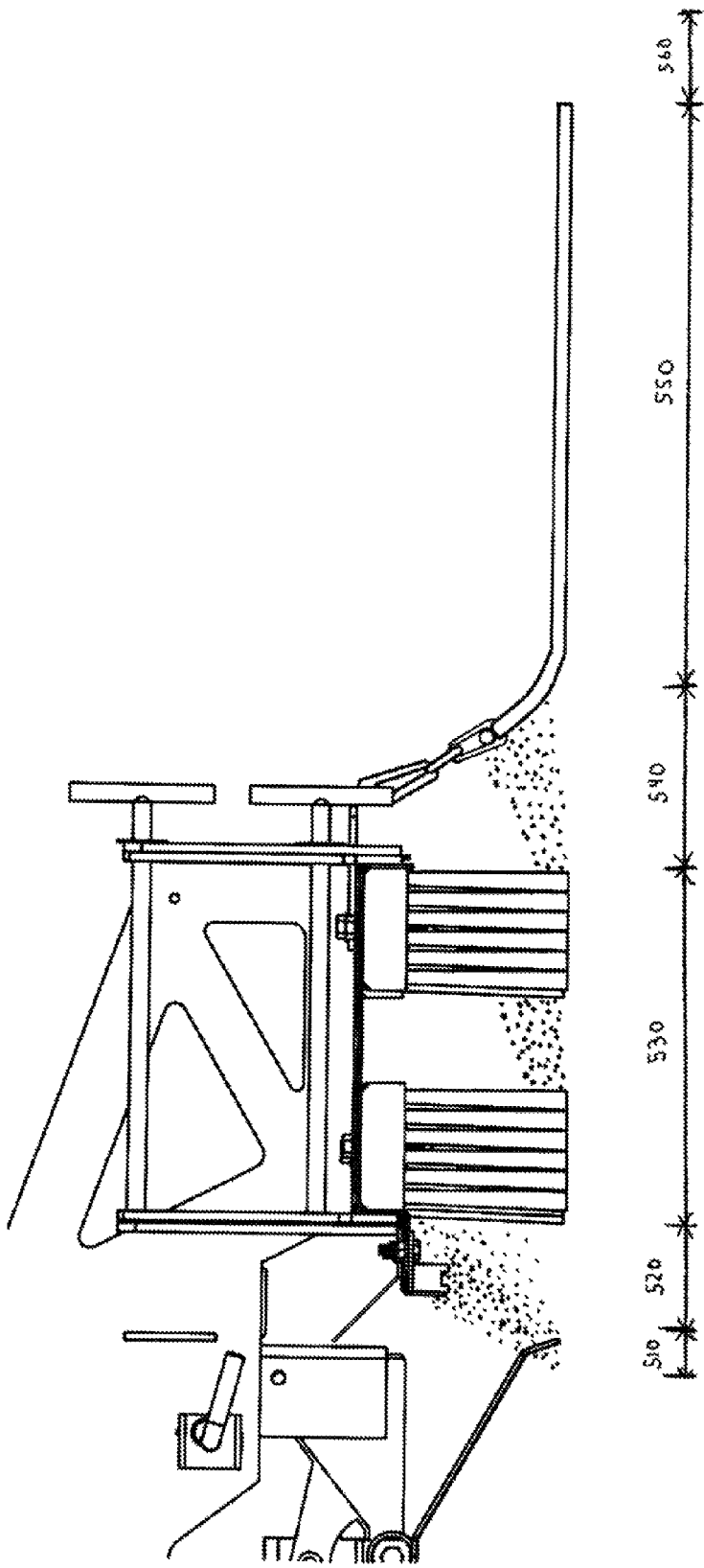
FIG. 5 depicts events at different stations of conditioning grooming implement.

One disclosed embodiment includes a process to maintain synthetic turf. The process uses two the implements to accomplish the task. The two implements are a new conditioning groomer 200 (shown in FIGS. 2, 3 and 5), and a new finish groomer 600 (shown in FIGS. 8-10). FIG. 5 shows a side view of conditioning groomer 200 whereas sections or stations have been noted beginning at station 510, and ending with 560. The function performed at each station, as described in the context of events which happen at each station, are disclosed as follows.

Description of events which happen first at station 510, also known as distance stage 510, and through stage 560: Distance Stage 510 Tine section; tines loosen and pull up compacted infill from deep within the turf fibers, while also straightening tangled fibers. This action is accomplished with tines 285. Deep grooming helps with keeping drain paths open (infiltration), and is needed to prevent capping due to contamination from airborne dust, dirt, etc. Distance stage 520—Magnetic Debris Collection; this section collects debris on magnets that was imbedded in turf fibers. Distance stage 530—Broom Section; further straightens turf fibers, and pulls infill up and breaks up clumps and cleans infill. Brooms have special diagonal cut FIG. 4, which helps to roll and clean infill. Distance stage 540—Post Decompaction and redistribution. The infill which is being agitated, at this point is largely loosened from within fibers, pulled up and broken apart, and is now being thrown rearward and upward ready for redistribution and leveling. Where the infill is thrown into the turned up leading edge of the drag mat, the pattern that the infill makes on the drag mat can indicate the condition of the field. A smooth pattern indicates smooth and level infill levels, while a dancing/erratic pattern indicates the infill on the field needs to be leveled more. Distance stage 550; the purpose of the drag mat is to level the infill material. Tines and brooms do not level the infill, they only decompact. After the tines and brooms have traveled over turf, what is left is a soft (uncompacted) uneven field. The drag mat is able to pull material from the high spots, and deposit material in the low spots much like a road grader. Each section of the drag mat has what amounts to a very small blade running laterally across its width. The drag mat is also rigid laterally, to level from side to side.

Figure 6:
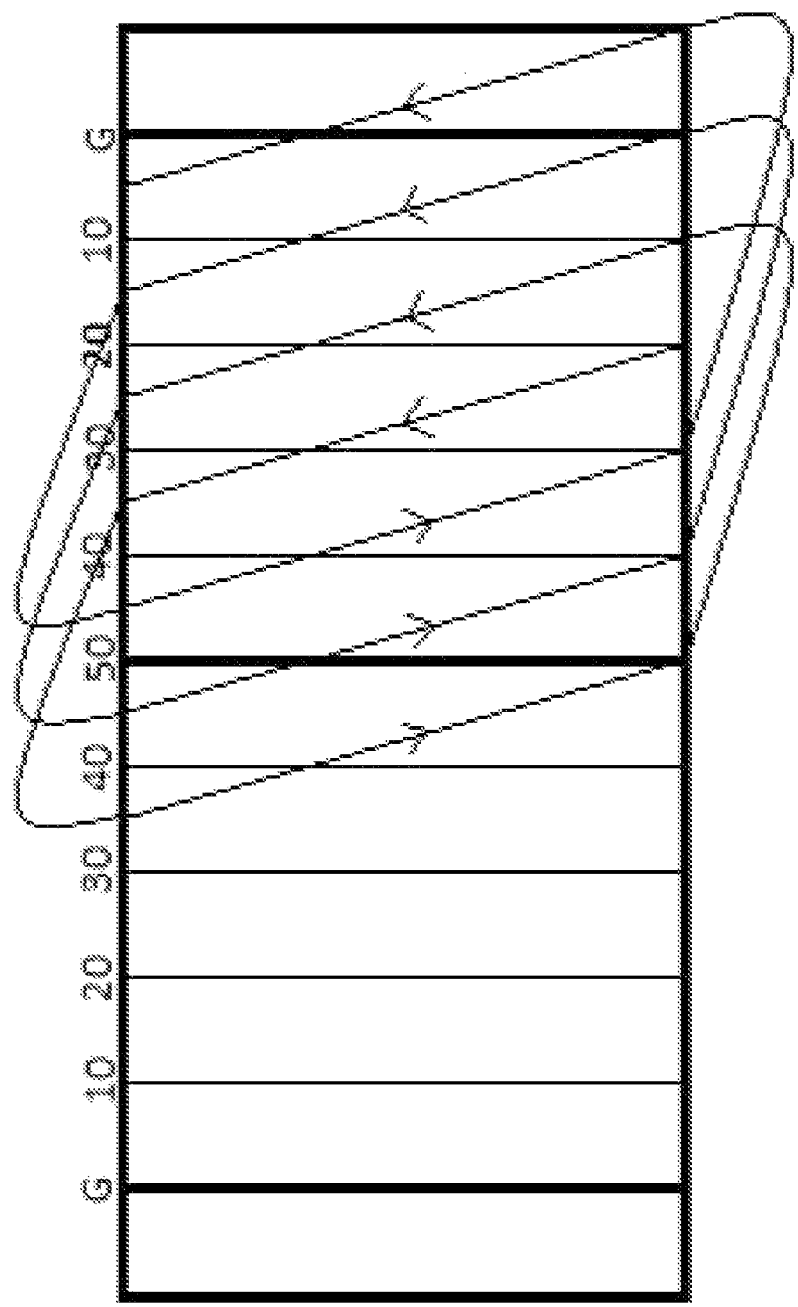
FIG. 6 shows conditioning groomer grooming technique first pass.
Figure 7:
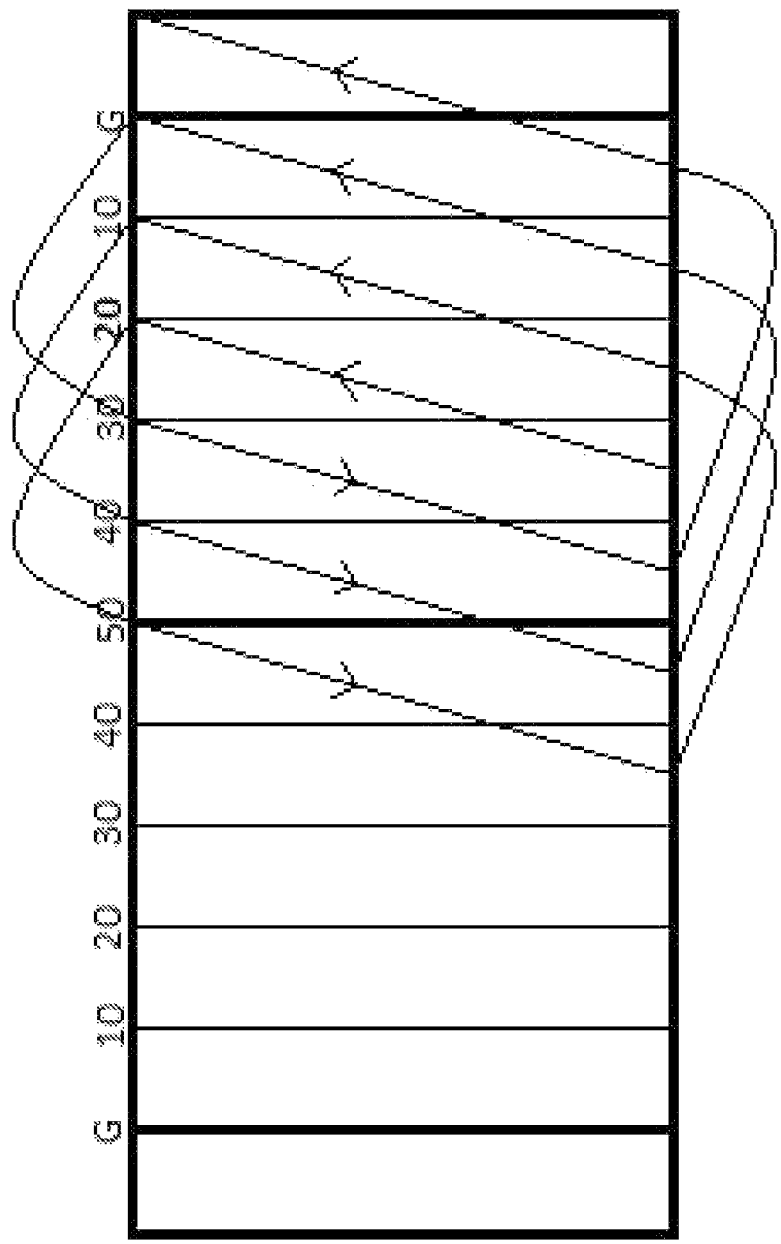
FIG. 7 shows conditioning groomer grooming technique second pass.
Figure 8:
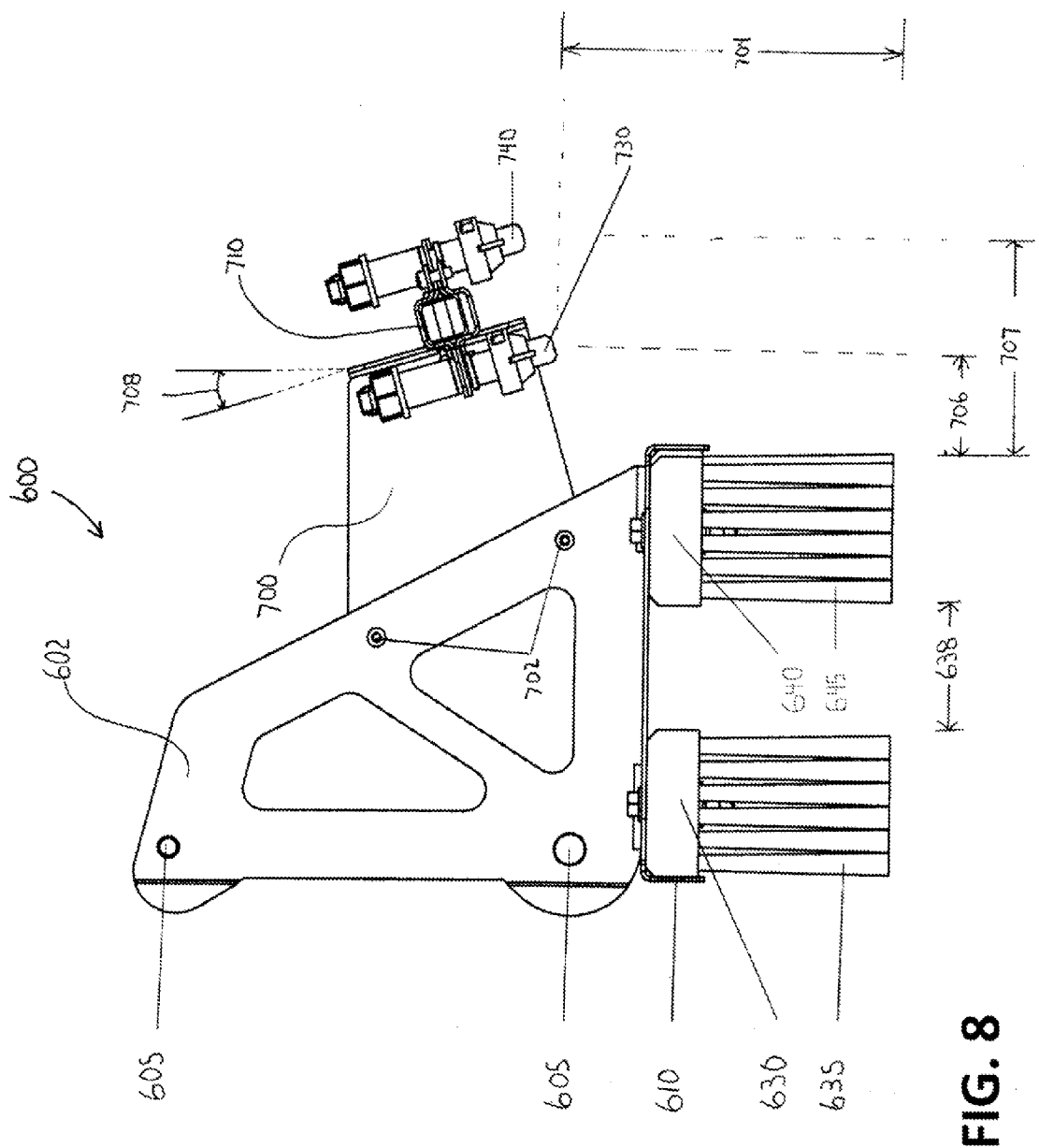
FIG. 8 shows side view of finish groomer.
Figure 9:
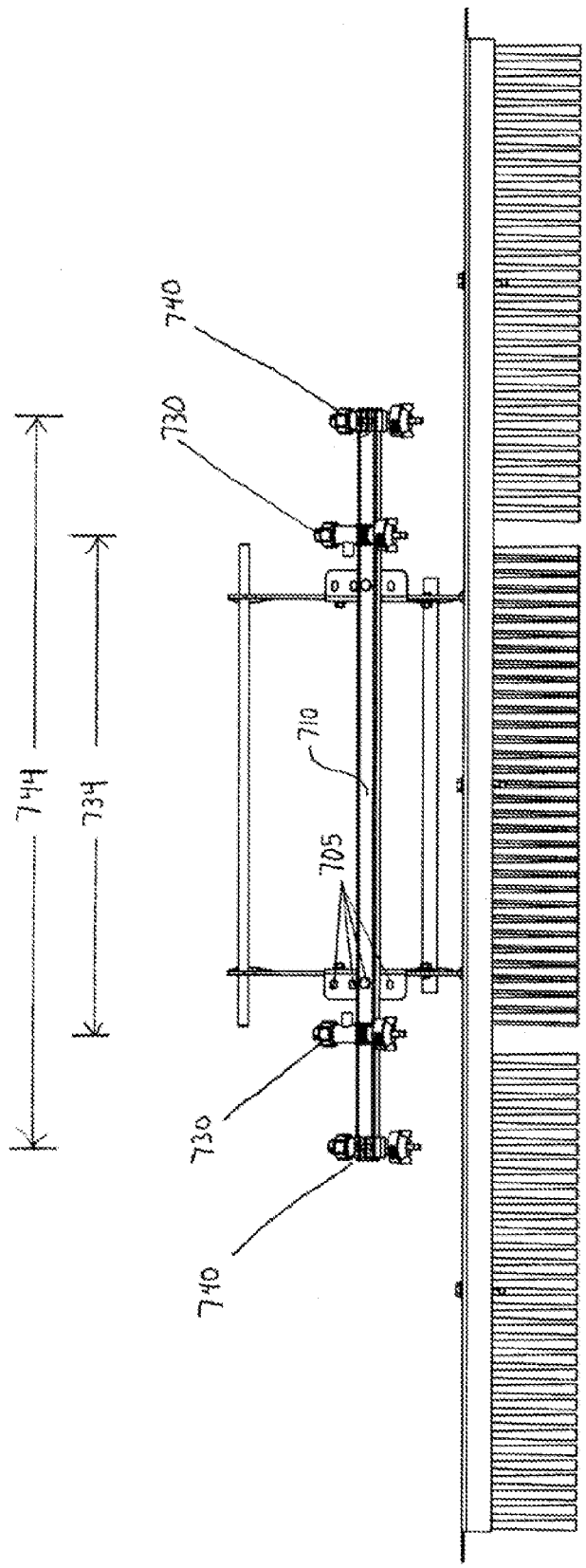
FIG. 9 shows rear view of finish groomer.

FIG. 6 shows a first grooming pattern for conditioning groomer in an exemplary embodiment. FIG. 7 shows a next pattern for conditioning groomer in an exemplary embodiment. The grooming patterns shown in FIGS. 6 and 7 are repeated in some embodiments until the pattern on the drag mat shows a smooth and level pattern. Grooming at angles as shown in these diagrams is important to final distribution of infill material. To properly pull from high spots and fill in low spots, this pattern will optimize grooming efficiency and ensure that machine travel does not add to the rutting laterally across field. In addition to machine travel, it is also often found that marching bands (which practice, or travel laterally across field) can be another source of lateral rutting. Also, random rutting can occur due to athletes practice or intensely played areas such as in front of goals or corner kick areas. The recommended grooming angles are typically between 15 degrees and 45 degrees from perpendicular to the sidelines. Angles near 15 degrees may be chosen when the possibility of pulling up seams in turf is a concern, otherwise varying the angles between 15-45 degrees is preferred for best results.

Distance stage 560—decompacted and level, ready for finish grooming. After the field has been groomed with the conditioning groomer, the field is decompacted, smooth and level. However, the infill will now be largely displaced from between the fibers and much of it lying on top of the fibers. The next step will be to groom with the finish groomer to reinsert the infill between the blades and prepare the surface for play.

Figure 10:
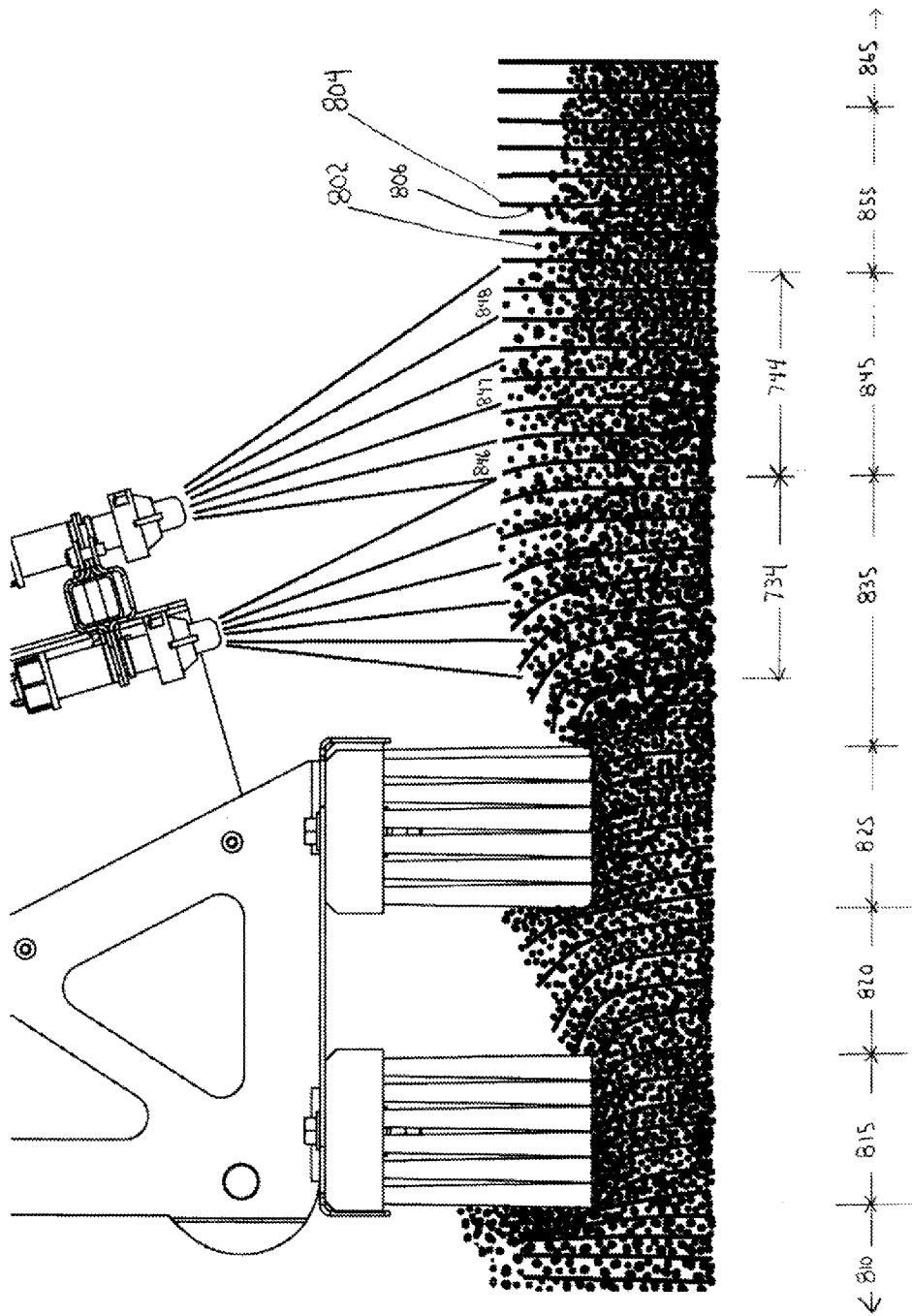
FIG. 10 depicts events at different stations of finish groomer implement.

FIG. 10 shows a side view of the finish groomer whereas stations have been noted beginning at station 810, and ending with 865. The function performed at each station, as described in the context of events which happen at each station, are disclosed as follows. Description of events and process, which happen first at station 810, also known as distance stage 810, and through stage 865:

Distance stage 810—after conditioning groomer has loosened infill 802, the infill has been largely pulled from between the blades of the grass fibers, decompacted, and has now been pulled upward and much will lay above the surface of the grass fibers.

Distance stage 815—the grass fibers will now be brushed in the direction of broom 630 travel and infill will start to be rolled in between the broom 630 and grass fiber 804. As they roll, some of the infill tends to be dispersed between grass blades, while the grass blades are straightened and pulled at a steep angle.

Distance stage 820—upon the broom 630 no longer touching grass fiber 804, the grass fiber will begin to stand up vertically, and while doing so, gravity will begin to allow infill 802 to settle down into grass fibers somewhat. Note: the infill does not tend to settle well unless grass blades are in a state of motion.

Distance stage 825—this stage repeats the 815 stage, a large amount of the infill however has now been dispersed and settled between the grass blade fibers. The action of the broom will bend the fibers over, this time with much more of the infill between blades. During this time, the infill will become somewhat compressed or squeezed tighter.

Distance stage 835—Grass fibers once again will begin to stand upright. This time, the fiber will be helped to stand up more aggressively due to the infill that was introduced deeper in the grass fibers during stage 820. That infill will help support and lift the blades, as the compressed infill expands, or decompresses. This helps the blades return to the upright position. It is important to keep the tractor ground speed to around 1-4 miles per hour at this time to prevent this action from being exaggerated. If higher speeds are used, the grass blades will come upright too rapidly, and consequently the infill will be launched somewhat like a catapult by the grass blades, and will have the opposite effect of allowing infill to settle. Simultaneously while the grass blades are moving from the laid over position and traveling to the upright position, the infill is deluged with a solution of water and anti-static/fabric softener. Note about fabric softener: see reference "A". The lubricity of the anti-static solution along with the assistance from the pressure and flow from the spray jets 730 and 740, pushes or washes the infill downward, deeper into the grass fibers. And as importantly, the atmospheric dust and dirt, being smaller particles that were dislodged from the infill particles, will be rinsed downward through the infill, and somewhat through the backing of the carpet turf. The spray jets have been mounted at a 16.3 degree angle 708 from vertical that allows solution to drive infill downward and not be shadowed by the grass blades. It is important to drive infill downward while the grass blades are still in motion on their way up to vertical. Further, the angle helps to push the grass blades back upright with pressure from the solution being sprayed.

If angle 708 is too vertical, (towards 0 degrees) the grass blades do not rise up as far toward vertical as is preferred while spraying the solution. If the angle is too steep, (>16 degrees) the solution pushes blades past vertical and also it not as effective at driving infill down into blades because the blades get pushed beyond vertical, in the opposite direction. It is most beneficial to drive the infill down with a stream of solution that closely matches being parallel to blades. Keep in mind that the stream of water that is rearmost 848 is at a higher angle and pushes blades back. The most direct stream 847 that is inline with the nozzle is responsible for the majority of the insertion, and is also the strongest. This, like the broom, gets done twice due to the dual rows of nozzles. (See FIG. 10). At 846, the infill is driven in from both sides of the blade. Note that the spray is a fan pattern as viewed from the side (stage 734 and 744).

A main point to this step and subsequent steps that are related to infill is the re-insertion of the infill material to support the fibers, and properly seat them and stabilize the infill for playability (G-Max) purposes while minimizing wear and getting repeatable acceptable G-Max numbers. Secondary purpose is one of appearance whereby black infill is no longer laying on surface of fibers, giving a dark (black) look to field.

Distance stage 845—a second nozzle 740 sprays solution again to assist the infill downward. Note that the angle of the stream at the leading edge of spray pattern 846 tends to push blades back down. In the center of spray pattern 847, it is spraying in-line with the blades. At aft end of spray pattern 848, it is helping straighten the blades to the vertical position. All this while, infill is being forced deeper into the grass blades, and the spray pattern is maximizing motion of the blades. In some embodiments, the motion of the blades has been found to be important to the efficient settling and movement of the infill within the blades.

Distance stage 855—at this point the blades and infill are wet with solution and the grass fibers and infill are no longer being exposed to the solution spray. The infill pieces 806 slowly roll down the grass blades 804 along with the solution, and settle deep into the grass blade fibers 804. Some infill pieces 806 commonly stick to the grass blades 804 and will not make their way fully to the bottom to rest atop the bottom layer of infill.

Distance stage 865—this stage is representative of the field condition after a dwell time of approximately 3-20+ minutes, depending on temperature, humidity, wind, how wet the field is from dew, spraying, direct sunlight, or other conditions. As can be seen, after the solution dries, the infill that was adhered to the sides of the grass due to cohesion of the water to itself, and cohesive forces of the water to the grass blades and the infill material, the infill continues to settle to a desired seated position. After the water has evaporated, the adhesive force of the water no longer exists, and the infill will detach from the grass blade. Another trait of the (fabric softener) is one of being antistatic. By nature of the field and grass blades being made of synthetic materials, static electricity often is present. This is known to make the infill stick to many things, including players, equipment and in this case the blades of grass. The addition of the fabric softener helps the process by allowing the infill to drop from the sides of the blades of grass after the solution dries, without being hindered by the static electricity charge that commonly would be present. Getting the infill properly seated gives support to the grass blade, as it shores up the blade and keeps it vertical and prevents pile lean and flattening. Keeping the blades vertical reduces wear and fibrillation due to spike contact on bent over blades, where the spike would tend to cut or shear the blade instead of inserting itself beside the blade. Proper reseating of the infill within the fibers gives enhanced safety with the benefit of increased foot stability when the athlete runs across the freshly rejuvenated field.

Referring now back to FIGS. 2, 3, 4, and 5, shown are different views of conditioning groomer assembly 200 and its components. The upper and lower mount pins 205 mount to tractor 100 hitch plate 122 with the latch mechanism or lock assembly 124. Raising and lowering the assembly 200 primarily controls the height and pressure of brooms 330 as the brooms 330 are rigidly mounted to the frame 208 that the pins 205 are fixed to.

The tine support plate assembly 215 mounts within the frame 208 of groomer 200. The height and consequently pressure of tines 285 is adjusted by positioning the tine support plate 215 higher or lower vertically within the groomer frame 208. Vertical adjustment of the tine support plate is accomplished with the following components: Tine support plate 215 includes a series of notches 216, with only one notch being visible in the illustrated configuration. The notches 216 on the leading edge of the tine support plate engage with the fixed cross shaft 210 at the upper end and the quick adjust latching pin 220 at the lower end. The latching pin 220 is spring 230 loaded and roll pins 235 that pass through latching pin 220 locks into detents in bracket 225. The rear stop brace 240 is the rear support for tine support plate 215.

A plurality of spring tines 285 are attached to the tine mount bar 265. The aggressiveness of the tine 285 action is controlled by rotating the tine mount bar 265. Rotating clockwise, as viewed from the FIG. 3 left side view, has the effect of being more aggressive, and rotating counterclockwise being less aggressive. Adjustment is made by loosening pivot bolts 275 and angle lock bolt 262, grasping tine angle adjust handle 261 and rotating clockwise or counterclockwise within range of slot 260. When the desired angle is achieved, fasteners 275 and 262 are retightened.

If machine 100 travels in reverse, fixed tines would have a dangerous tendency to drive themselves deep into the synthetic turf usually with the effect of damaging, or ripping the carpet/turf. The tine support outboard swing links (2 each) 250 and tine support center swing link 255 prevent this from happening. Upon reverse movement of machine 100, swing links 250 and 255 rotate clockwise on swing link hinge pins 245 (3 each) to retract tines into a safe, faired position.

One or more magnets 295 are installed under a flange 315 on the leading edge of broom channel 310 to collect certain metallic and/or magnetic debris from the field being groomed. Magnets alone will not pick up debris from within or on top of the surface of the turf due to magnetic field diminishment (field diminishes at the inverse cube of the distance 1/r3). The dragging of the tines 285 will flick debris upward and rearward towards magnets 295. A deflector 290 is installed at an angle, forward and above the magnets 295 to guide debris into the direction of the magnets. Upon passing in close proximity of the magnets, the debris will collect on a magnet. For safety purposes, magnet height is such that even with machine hitch 122 in full down position, with no brooms 330 installed, and tines 285 retracted in full "up" position, the magnets will not contact the turf. This is to minimize possibility of turf damage due to inadvertent adjustment or setting of implement height. If it is desired to reduce magnet height from the turf or carpet surface—to increase the magnetic debris collection rate, a spacer may be inserted at position 305.

Figure 4:
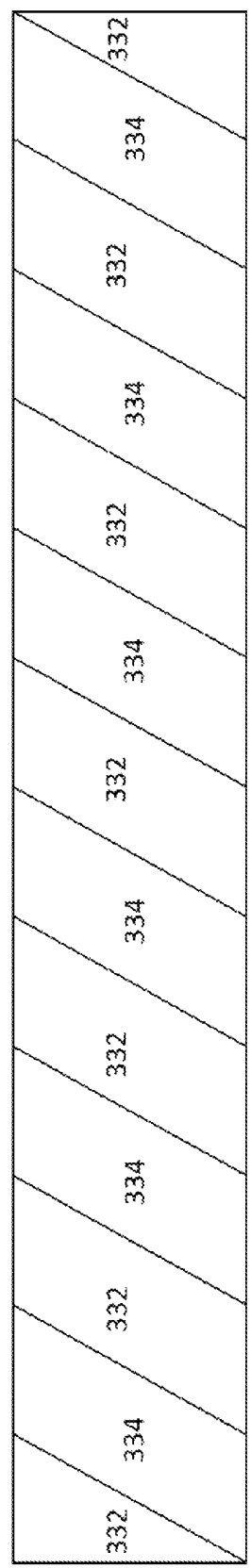
FIG. 4 describes configuration of broom channel and bristle pattern.

Brooms 330 are attached to broom channel 310. Broom channel 310 is rigid laterally, and assists with the lateral leveling effect of infill material. Brooms 330 are spaced within channel 310 or have an aperture between them to allow infill to flick upward from the forward broom, while still remaining contained awaiting re-agitation from the aft broom. Brooms 330 have special bristle patterning that assists with the process. As viewed from bottom of a broom, FIG. 4 depicts the broom 330 bristle height pattern. Short bristle sections 332 are alternated with long bristle sections 334 along width of broom. In exemplary embodiments, the pattern is diagonal in nature. The disclosed pattern has the effect of full coverage brush bristle exposure to grass blades, without the undesirable effect of having infill material building up in front of broom. More explicitly when raising the broom from surface while driving, a large deposit of infill material is minimized. A secondary positive effect is one where if more down pressure is applied, the shorter bristles have a more aggressive action on the turf, due to shorter bristles having less flex and are more upright an angle. Bristles within the broom channel are of a sturdy polypropylene construction.

An additional mechanism is available to increase the overall width of the implement, and includes mounts 340 on both sides of the frame of the main broom channel 310, a hinge pin 360, a retract and deploy pin 365 and additional sections of broom channel 370 with mounts 350 that are mounted on the outboard of the main broom channel section that becomes able to retract and deploy.

A drag mat 450 is mounted behind the broom section. Drag mat 450 is attached to drag mat mount tabs 400 with an upper carabiner 410 to provide a quick attach/detach point. A short coupling link 420 connects to the lower carabiner link 430. The lower carabiner link is affixed to both the drag mat 450 and a drag mat stiffener bar 440. Additionally the stiffener bar is attached to the drag mat with clamps 445 along several areas along leading edge.

Referring again to FIGS. 8, 9, and 10, shown are different views of finish groomer assembly 600 and its components. The upper and lower mount pins 605 mount to tractor 100 hitch plate 122 with the lock assembly 124. Raising and lowering the assembly 600 primarily controls the height and pressure (applied to the turf) of brooms 630 and 640, as the brooms 630 and 640 are rigidly mounted to the frame 602 that the 605 pins are fixed to.

Brooms 630 and 640 are attached to broom channel 610. Broom channel 610 is attached to a side plate of groomer frame 602. In one exemplary embodiment, broom fibers 635 and 645 are of natural Tampico composition. Compared to the conditioning groomer brushes, they are much softer, and thinner fibers. The fiber stiffness is soft and flexible so that when they are pulled across the turf at between 1-4 mph, the infill is pulled into the turf fibers, not flicked. The soft broom bristles gently pull the turf fibers toward horizontal, while at the same time, pulling infill into the turf fibers. At the trailing edge of the brush, the soft brush fibers gently allow the turf fibers to be released and rise toward vertical without having a flicking action. The first row brooms 630 and second row brooms 640 have an aperture 638 between them. This allows cycling of grass blades to stand up between broom rows. The natural fiber material of brooms 630 and 640 minimizes static buildup. Static buildup would tend to hinder or limit settling of infill within turf fibers. The brooms are able to accept wider wings and hardware similar to the conditioning groomer for extending coverage width.

Spray boom mount 700 supports spray boom 710. Forward nozzles 730 and aft nozzles 740 are mounted to spray boom 710. Spray boom 710 is mounted at a 16.3 degree angle 708 in an exemplary embodiment. The main spray pattern from forward nozzles 730 and aft nozzles 740 becomes concentrated and begins at roughly points or patterns 706 and 707, respectively. The first row nozzle pattern 706 is located as near as possible to the aft end of broom 640 to deluge infill, while the grass blades are in motion, at a high angle from vertical. The second row nozzle pattern 707 is spaced back to deluge at more upright grass blade angles and to continue to drive infill deeper within the blade fibers. Nozzles 730 and 740 are plumbed to athletic field maintenance tractor 100 fluid dispensing point 136 via flexible tubing and associated fittings and manifolds. Spray nozzles 730 and 740 are spaced along the width of the boom, and are adjustable in distance 734 and 744 between spray nozzles to get an even spray pattern. Spray boom 710 is adjustable in height 704 relative to the turf with a plurality of mount slots 705 in rear flange of spray boom mount bracket 700. The width of spray boom 710 can be extended, and additional nozzles added to accommodate a wider version of groomer. Spray boom mount 700 is affixed to groomer section 602, with fasteners 702.

Proper usage of this equipment will enhance the playability of synthetic ball fields. Characteristics such as ball rolling resistance, speed and bounce, hardness of the field (sometimes measured with G-max equipment or other ratings devices or systems), and overall evenness seen both in flatness of the field and in uniform G-max readings, are greatly affected by proper maintenance equipment and the usage thereof.

Figure 11:
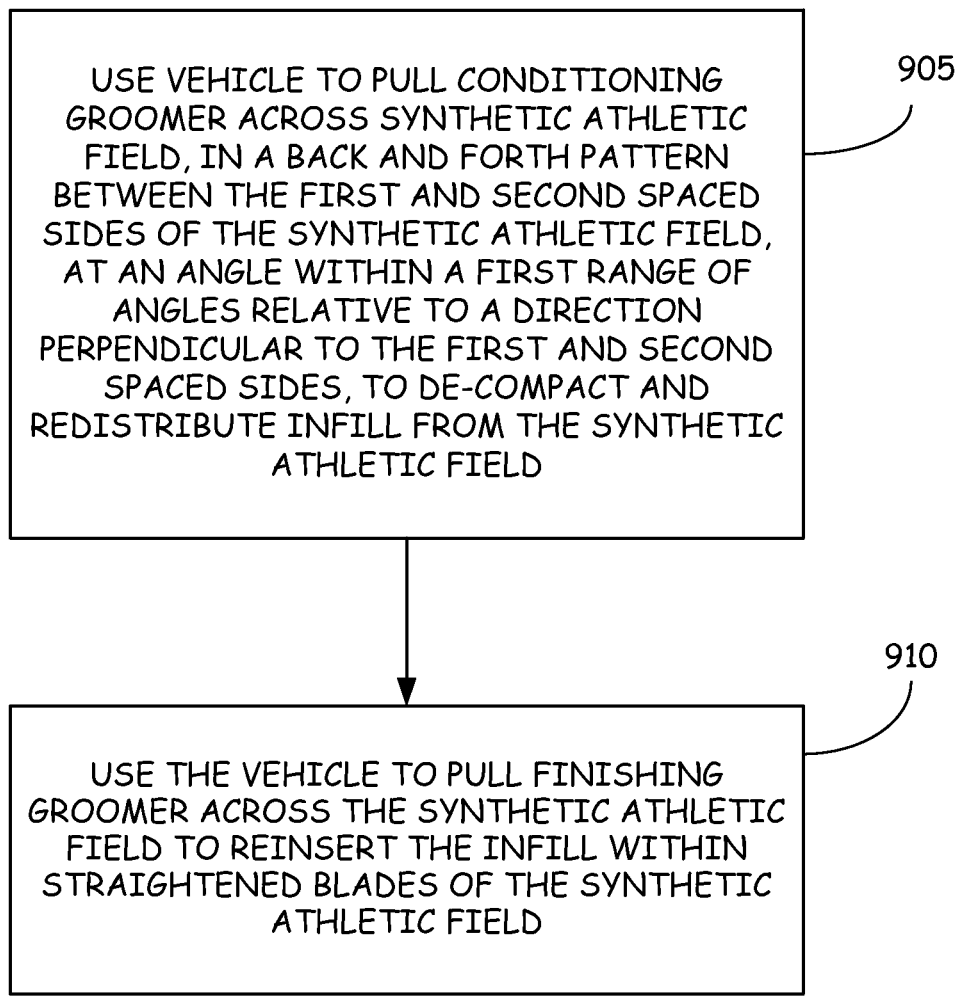
FIG. 11 is a flow diagram illustrating an exemplary method as described with reference to FIGS. 1-10.

Referring now to FIG. 11, shown is a flow diagram illustrating the method described above with reference to FIGS. 1-10. The method illustrated in FIG. 11 is a method of grooming a synthetic athletic field which has first and second longitudinally spaced ends and first and second spaced sides extending between the first and second longitudinally spaced ends. See e.g., FIGS. 6 and 7 which illustrate a field in a typical American football format with first and second ends spaced apart by a longer distance than are the first and second sides of the field.

As shown at block 905, the method includes a step of using a vehicle to pull a conditioning groomer implement across the synthetic athletic field, in a back and forth pattern between the first and second spaced sides of the synthetic athletic field at an angle within a first range of angles relative to a direction perpendicular to the first and second spaced sides, to de-compact and redistribute infill from the synthetic athletic field. As shown at block 910, the method next includes using the vehicle to pull a finishing groomer implement across the synthetic athletic field to reinsert the infill within straightened blades of the synthetic athletic field. Various more detailed embodiments of these two steps, representing a 2-stage process, are as described above with reference to FIGS. 1-10. However, some of these more detailed embodiments are summarized below. Embodiments not summarized below are nevertheless considered to fall within the scope of various method embodiments.

In an exemplary embodiment, the step 905 of using the vehicle to pull the conditioning groomer implement across the synthetic athletic field in the back and forth pattern between the first and second spaced sides at the angle within the first range of angles further comprises using the vehicle to pull the conditioning groomer implement across the synthetic athletic field in the back and forth pattern between the first and second spaced sides at the angle within the range of 15 degrees and 45 degrees relative to the direction perpendicular to the first and second spaced sides.

In some exemplary embodiments, the step 905 of using the vehicle to pull the conditioning groomer implement across the synthetic athletic field in the back and forth pattern further comprises dragging at least two rows of brushes of the conditioning groomer over the synthetic athletic field, with the at least two rows of brushes have a pattern of alternating shorter and longer bristle height sections oriented diagonally to prevent infill material buildup in front of the brushes.

In some embodiments, the step 905 of using the vehicle to pull the conditioning groomer implement across the synthetic athletic field in the back and forth pattern further comprises pulling a drag mat mounted behind the at least two rows of brushes across the synthetic athletic field to level infill material.

In some embodiments, the step 905 of using the vehicle to pull the conditioning groomer implement across the synthetic athletic field in the back and forth pattern further comprises loosening and pulling up compacted infill in the synthetic athletic field with a plurality of adjustable height tines positioned forward of the at least two rows of brushes.

In some embodiments, the step 905 of using the vehicle to pull the conditioning groomer implement across the synthetic athletic field in the back and forth pattern further comprises collecting metallic or magnetic debris flicked upward by the plurality of adjustable height tines using at least one magnet positioned above and not in contact with the synthetic athletic field and positioned between the plurality of adjustable height tines and the at least two rows of brushes.

In some embodiments, the step 910 of using the vehicle to pull the finishing groomer implement across the synthetic athletic field to reinsert the infill within straightened blades of the synthetic athletic field further comprises dragging at least two rows of brushes of the finishing groomer over the synthetic athletic field, wherein bristles of the at least two rows of brushes of the finishing groomer are less stiff than bristles of the at least two rows of brushes of the conditioning groomer.

In some embodiments, the step 910 of using the vehicle to pull the finishing groomer implement across the synthetic athletic field to reinsert the infill within straightened blades of the synthetic athletic field further comprises spraying an anti-static solution on the synthetic athletic field using at least one spray nozzle mounted rearward of the at least two rows of brushes of the finishing groomer to prevent the infill material from sticking to blades of the synthetic athletic field.

Appendix

REFERENCES

Reference "A"—Note about fabric softener: wiki http://en.wikipedia.org/wiki/Fabric_softener; Fabric softener From Wikipedia, the free encyclopedia:

Fabric softener (also called fabric conditioner) is a conditioner used to prevent static cling and make fabric softer. It is available as a liquid, crystals, and dryer sheets.

Varieties

Many modern washing machines have a dispenser which can add liquid fabric softener to the load of laundry automatically on the final rinse; in launderettes one may need to add it manually.

Fabric softeners work by coating the surface of the cloth fibers with a thin layer of chemicals; these chemicals have lubricant properties and are electrically conductive, thus making the fibers feel smoother and preventing buildup of static electricity. Other functions are improvements of iron glide during ironing, increased resistance to stains, and reduction of wrinkling and pilling.

Cationic softeners bind by electrostatic attraction to the negatively charged groups on the surface of the fibers and neutralize their charge; the long aliphatic chains are then oriented towards the outside of the fiber, imparting lubricity. Vinegar works on some materials in a similar way, as the hydrogen ions bind to the anionic groups on the fibers.

Composition

The earliest fabric softeners were developed during early 20th century to counteract the harsh feel which the drying methods imparted to cotton. The cotton softeners were typically based on water emulsion of soap and olive oil, corn oil, or tallow oil.

Contemporary fabric softeners tend to be based on quaternary ammonium salts with one or two long alkyl chains, a typical compound being dipalmitoylethyl hydroxyethylmonium methosulfate. Other cationic compounds can be derived from imidazolium, substituted amine salts, or quaternary alkoxy ammonium salts. One of the most common compounds of the early formulations was dihydrogenated tallow dimethyl ammonium chloride (DHTDMAC).

Anionic softeners and antistatic agents can be, for example, salts of monoesters and diesters of phosphoric acid and the fatty alcohols. These are often used together with the conventional cationic softeners. Cationic softeners are incompatible with anionicsurfactants used in the bulk of surfactants used in detergents, with which they form a solid precipitate. Therefore, they have to be added during the rinse cycle instead. Anionic softeners can be combined with anionic surfactants directly. Other anionic softeners can be based on smectite clays. Some compounds, such as ethoxylated phosphate esters, have softening, anti-static, and surfactant properties.

The softening compounds differ in affinity to different materials. Some are better for cellulose-based fibers, others have higher affinity to hydrophobic materials like nylon, polyethylene terephthalate, polyacrylonitrile, etc.

Silicone-based compounds such as polydimethylsiloxane comprise the new softeners which work by lubricating the fibers. Derivatives with amine- or amide-containing functional groups are used as well. These groups help the softeners bind better to fabrics.

As the softeners themselves are often of hydrophobic nature, they are commonly occurring in the form of an emulsion. In the early formulations, soaps were used as emulsifiers. The emulsions are usually opaque, milky fluids. However there are alsomicroemulsions where the droplets of the hydrophobic phase are substantially smaller [not specific enough to verify]. The advantage of microemulsions is in the increased ability of the smaller particles to penetrate into the fibers. A mixture of cationic and non-ionic surfactants is often used as an emulsifier. Another approach is using a polymeric network, an emulsion polymer.

Other compounds are included to provide additional functions; acids or bases for maintaining the optimal pH for adsorption to the fabric, electrolytes, carriers (usually water, sometimes water-alcohol mixture), and others, e.g. silicone-based anti-foaming agents, emulsion stabilizers, fragrances, and colors. A relatively recent form on the market are the ultra-concentrates, where the amount of carriers and some other chemicals is substantially lower and much smaller volumes are used.

Although the present invention has been described with reference to preferred embodiments, workers skilled in the art will recognize that changes may be made in form and detail without departing from the spirit and scope of the invention.

What is claimed is:

1. A synthetic athletic field grooming apparatus configured to be pulled by a vehicle across a synthetic athletic field for use in maintaining the synthetic athletic field, the synthetic athletic field grooming apparatus comprising:
   a frame having a coupling mechanism at a front of the grooming apparatus for mounting the grooming apparatus to the vehicle;
   at least one broom channel coupled to the frame rearward of the coupling mechanism and extending longitudinally from a first side of the at least one broom channel to a second side of the at least one broom channel;
   a forward row of brushes attached to the at least one broom channel, the forward row of brushes extending longitudinally from the first side of the at least one broom channel to the second side of the at least one broom channel;
   an aft row of brushes attached to the at least one broom channel such that the aft row of brushes is spaced apart from and rearward of the forward row of brushes relative to the coupling mechanism to allow infill of the synthetic athletic field to flick upward from the forward row of brushes while containing the infill for re-agitation from the aft row of brushes when the grooming apparatus is being pulled across a synthetic athletic field, the aft row of brushes extending longitudinally from the first side of the at least one broom channel to the second side of the at least one broom channel;

wherein at least one of the forward and aft rows of brushes includes a pattern of alternating bristle height sections comprising alternating short bristle sections and long bristle sections oriented diagonally to prevent infill material buildup in front of the brushes;

wherein the coupling mechanism and the frame are configured such that when attached to a vehicle and being pulled across the synthetic athletic field, the vehicle can control a downward pressure forcing the forward and aft rows of brushes into contact with the synthetic athletic field.

2. The synthetic athletic field grooming apparatus of claim 1, and further comprising a drag mat mounted behind the forward and aft rows of brushes and configured to level infill material.

3. The synthetic athletic field grooming apparatus of claim 1, and further comprising a tine support plate assembly coupled to the frame forward of the at least one broom channel and the forward and aft rows of brushes, wherein the tine support plate assembly includes a plurality of tines with adjustable heights, angles and pressures configured to loosen and pull up compacted infill in the synthetic athletic field when the grooming apparatus is pulled by a vehicle across the synthetic athletic field.

4. The synthetic athletic field grooming apparatus of claim 3, wherein the plurality of tines are configured to retract if the synthetic athletic field grooming apparatus is moved in a reverse direction such that damage to the synthetic athletic field is prevented.

5. The synthetic athletic field grooming apparatus of claim 3, and further comprising at least one magnet mounted between the plurality of tines and the forward row of brushes to collect metallic or magnetic debris flicked upward by the plurality of tines, wherein the at least one magnet is mounted at a height such that it cannot contact the synthetic athletic field as the grooming apparatus is pulled by the vehicle across the synthetic athletic field.

6. The synthetic athletic field grooming apparatus of claim 5, and further comprising a deflector positioned forward and above the at least one magnet to guide the metallic or magnetic debris into the at least one magnet.

7. A synthetic athletic field grooming apparatus configured to be pulled by a vehicle across a synthetic athletic field for use in maintaining the synthetic athletic field, the synthetic athletic field grooming apparatus comprising:

a frame having a coupling mechanism at a front of the grooming apparatus for mounting the grooming apparatus to the vehicle;

at least one broom channel coupled to the frame rearward of the coupling mechanism and extending longitudinally from a first side of the at least one broom channel to a second side of the at least one broom channel;

a forward row of brushes attached to the at least one broom channel, the forward row of brushes extending longitudinally from the first side of the at least one broom channel to the second side of the at least one broom channel;

an aft row of brushes attached to the at least one broom channel such that the aft row of brushes is spaced apart from and rearward of the forward row of brushes relative to the coupling mechanism to allow infill of the synthetic athletic field to flick upward from the forward row of brushes while containing the infill for re-agitation from the aft row of brushes when the grooming apparatus is being pulled across a synthetic athletic field, the aft row of brushes extending longitudinally from the first side of the at least one broom channel to the second side of the at least one broom channel;

at least one spray boom coupled to the frame rearward of the aft row of brushes, and at least one spray nozzle mounted on the at least one spray boom and configured to spray an anti-static solution on the synthetic athletic field to prevent the infill material from sticking to blades of the synthetic athletic field, wherein the at least one spray nozzle comprises at least one forward spray nozzle and at least one aft spray nozzle positioned rearward of the at least one forward spray nozzle, wherein the at least one forward spray nozzle is positioned closer to the aft row of brushes than is the at least one aft spray nozzle such that the at least one forward spray nozzle and the at least one aft spray nozzle spray the synthetic athletic field with blades of the synthetic athletic field being at different angles relative to vertical;

wherein the coupling mechanism and the frame are configured such that when attached to a vehicle and being pulled across the synthetic athletic field, the vehicle can control a downward pressure forcing the forward and aft rows of brushes into contact with the synthetic athletic field.

8. The synthetic athletic field grooming apparatus of claim 7, wherein the at least one forward spray nozzle and the at least one aft spray nozzle are spaced along a width of the apparatus and are adjustable to allow adjustment of distances between spray nozzles to provide an adjustable spray pattern.

9. The synthetic athletic field grooming apparatus of claim 7, wherein the aft row of brushes is an aft-most row of brushes of the synthetic athletic field grooming apparatus with no brushes rearward of the aft row of brushes or between the at least one forward spray nozzle and the at least one aft spray nozzle.

10. The synthetic athletic field grooming apparatus of claim 7, wherein the at least one spray nozzle comprises the at least one forward spray nozzle and the at least one aft spray nozzle with no brushes positioned between the at least one forward spray nozzle and the at least one aft spray nozzle.

11. The synthetic athletic field grooming apparatus of claim 7, wherein the at least one spray nozzle comprises the at least one forward spray nozzle and the at least one aft spray nozzle both positioned rearward of all brushes of the synthetic athletic field grooming apparatus.

12. The synthetic athletic field grooming apparatus of claim 7, wherein the at least one forward spray nozzle and the at least one aft spray nozzle are mounted on the at least one spray boom at an angle greater than zero relative to vertical.

* * * * *